No. 642,094. Patented Jan. 30, 1900.
F. DOWNING.
BIRD CAGE PERCH AND ATTACHMENT.
(Application filed Feb. 25, 1899.)
(No Model.)
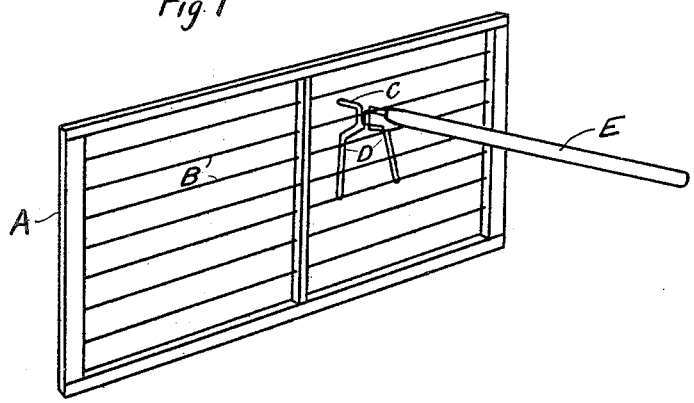
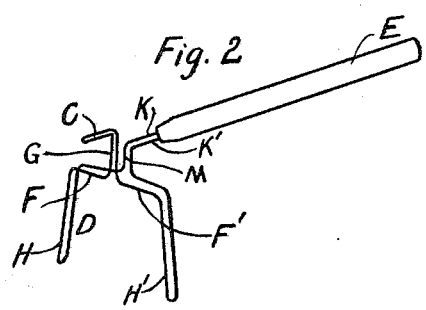
Witnesses
J. H. Barley.
H. Eckardt.
Inventor
Fred Downing
per Joseph Doust
attorney

UNITED STATES PATENT OFFICE.

FRED DOWNING, OF TORONTO, CANADA.

BIRD-CAGE PERCH AND ATTACHMENT.

SPECIFICATION forming part of Letters Patent No. 642,094, dated January 30, 1900.

Application filed February 25, 1899. Serial No. 706,899. (No model.)

*To all whom it may concern:*

Be it known that I, FRED DOWNING, a subject of the Queen of England, residing at Toronto, in the county of York and Province of Ontario, Dominion of Canada, have invented or discovered certain new and useful Improvements in Bird-Cage Perches and Attachments; and I do hereby declare the following to be a full, clear, and exact description of the invention or discovery, such as will enable others skilled in the art to which it appertains to make and use the same, reference being had to the accompanying drawings, forming a part of this specification.

My invention relates to improvements in bird-cage perches and attachments; and the objects of the improvements are, first, to provide a perch which can be quickly and easily adjusted without opening the cage or disturbing the bird, and, second, to provide an attachment for said perch which will hold the perch in position and at the same time allow the perch to sway back and forth as if the bird had alighted on a small twig of a tree. I attain these objects by the mechanism illustrated in the accompanying drawings, in which—

Figure 1 is a perspective view of one side of a cage with the perch in position, and Fig. 2 is a perspective view of the perch and the attachment.

Similar letters refer to similar parts throughout both views.

A represents the frame of one side of the cage or part of one side of the cage, and B represents wires of the said frame. The side of the frame next to the observer corresponds to the inside of the cage. The attachment D is made of one piece of wire. It is bent at the center until the two ends come together, thus forming a double wire. A short distance from the bent end this double wire is bent downward at right angles to its former direction. Then each part of the double wire is bent outwardly in opposite directions and at right angles to the direction of the part C and also at right angles to the second portion, which is bent downward. Each part F and F' is then abruptly bent downward at right angles, and parallel to G. The two parts H and H' are then abruptly bent upward, and the reverse operations are made until the two ends K and K' are brought together. These two ends extend in an opposite direction from the part C and at right angles to M. These two ends K and K' are fastened to the perch E, which can be made of any suitable material, or it may be a continuation of the attachment. By means of the handle C the perch can be taken out of or put in position at will.

I am aware that prior to my invention spring-perches have been in use; but they are used in conjunction with a plate, bar, or cross-head which is clasped to the wires of the cage.

In my invention the spring which gives the elastic movement to the perch forms an integral part of the apparatus which maintains the perch in its position.

Having thus described my invention, what I claim as new, and desire to secure by Letters Patent, is—

The combination of the perch E, with the herein-described spring-wire attachment secured to the said perch by the ends of the wire K and K' and provided with clasps H and H' and handle C, substantially as described.

In testimony that I claim the foregoing as my invention I have signed my name, in presence of two witnesses, this 17th day of February, 1899, at Toronto, Ontario, Canada.

FRED DOWNING.

Witnesses:
H. ECKARDT,
WM. JENKINS.